United States Patent [19]

Streeter

[11] 4,339,887
[45] Jul. 20, 1982

[54] DECOY, MOLD AND METHOD OF CONSTRUCTION

[76] Inventor: Wesley R. Streeter, Rte. 1, Box 548, Bastrop, La. 71220

[21] Appl. No.: 141,415

[22] Filed: Apr. 18, 1980

[51] Int. Cl.$^3$ ............................................. A01M 31/06
[52] U.S. Cl. ......................................................... 43/2
[58] Field of Search ............................... 43/3, 2; 46/22

[56] References Cited

U.S. PATENT DOCUMENTS

| 858,090 | 6/1907 | Meinecke | 46/22 |
| 1,157,627 | 10/1915 | Koyen et al. | 43/3 |
| 2,816,384 | 12/1957 | Rexius | 43/3 |
| 3,408,763 | 4/1968 | Rudolph | 43/3 |
| 3,520,078 | 7/1970 | Klamer | 46/22 |

FOREIGN PATENT DOCUMENTS 509170  1/1955  Canada ...................................... 43/3

Primary Examiner—James L. Jones, Jr.

[57] ABSTRACT

A life-like decoy for hunting purposes which includes a molded body portion having an internal cavity and a removable head and legs which can be stored in the cavity during transportation of the decoy. A mold for shaping a decoy which includes a pair of body segments with a cooperating cavity segment, and a pair of registering head segments for molding the decoy body and head, respectively, with the internal cavity provided in the body mold. A procedure and technique for constructing the body and cavity segments of the decoy which includes carving a mold model in selected detail to a desired shape and shaping the body and head segments and the cavity portion of the mold over the model in multiple layers of polymerized material and fiberglass mat to create a mold of exceptional strength, detail and release characteristics which can be used to form and shape multiple decoys without failure or warp.

1 Claim, 10 Drawing Figures

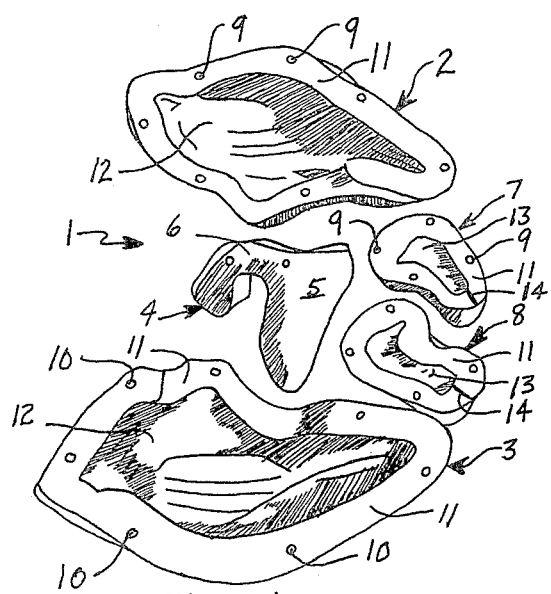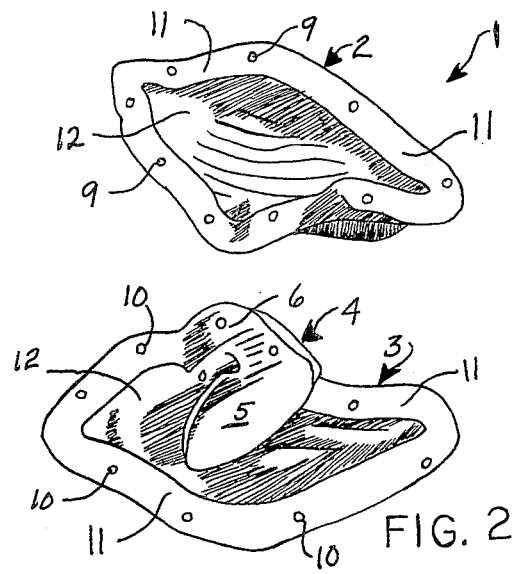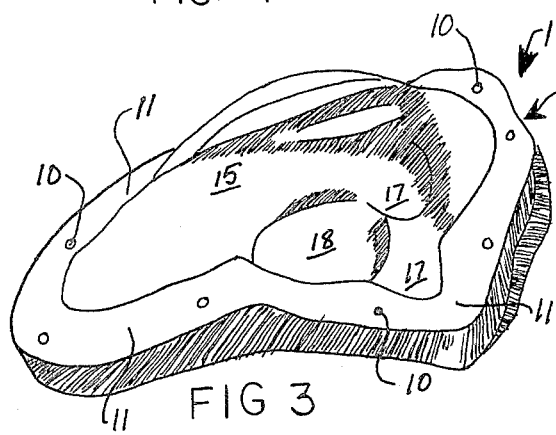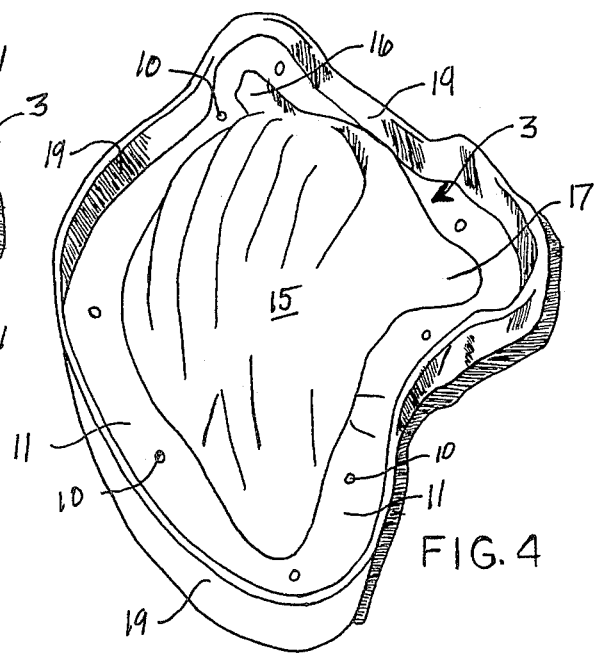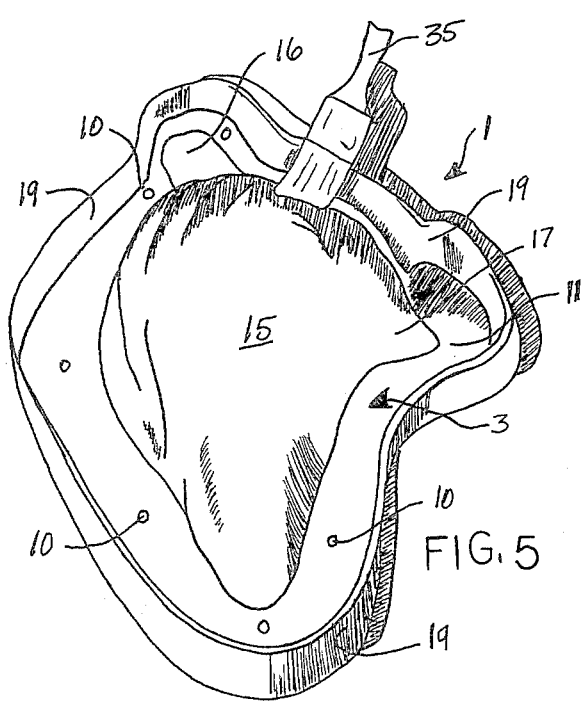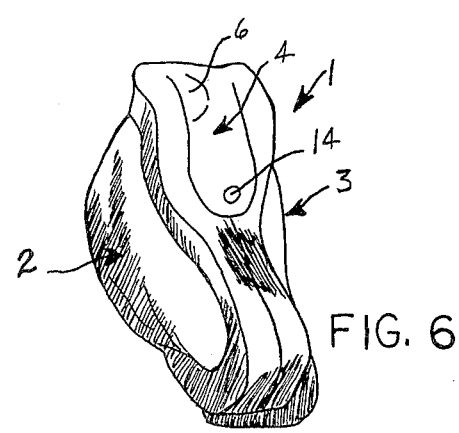

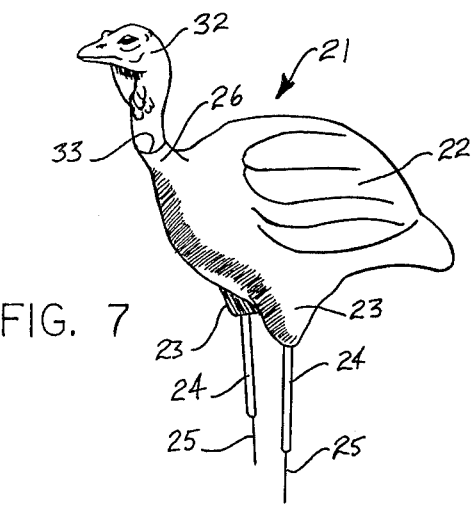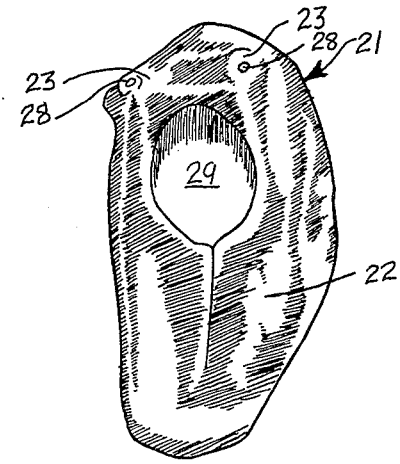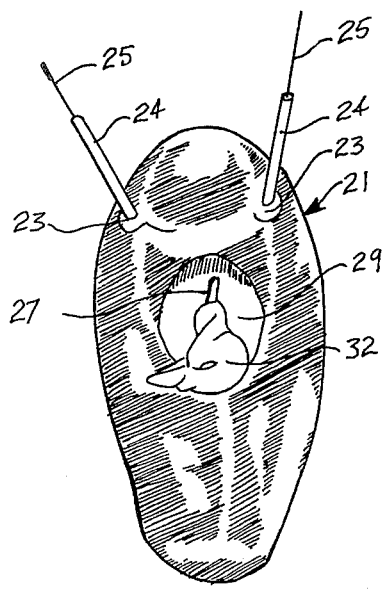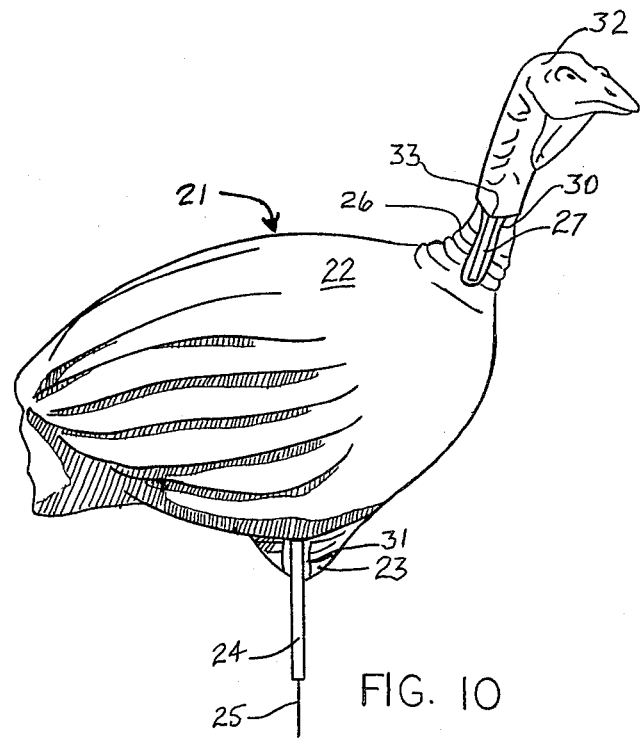

DECOY, MOLD AND METHOD OF CONSTRUCTION

BACKGROUND OF THE INVENTION

1. Field of the Invention

This invention relates to field decoys for use in hunting and more particularly, to molded game bird decoys and a mold for creating the decoys which is formed by initially sculpturing or shaping a mold model and subsequently forming the mold directly on the model by using a polymerizable material or materials containing powdered aluminum in successive laminations on the model to create a mold of exceptional strength, detail, and decoy-release characteristics for shaping the decoys. In a preferred embodiment of the invention the decoys created by the mold are formed of polyurethane, and the mold is created by the use of polymerized resins under controlled conditions and applied in multiple layers with the addition of atomized aluminum powder to enhance strength and mold-release characteristics. The decoys of this invention are characterized by exceptionally fine detail and are provided with an internal cavity for storing the removable legs and head when the decoys are not in use, and particularly while the decoys are being transported to a hunting site in the field. Atomized aluminum is used both in the construction of the mold to achieve good strength characteristics and to facilitate a quick release of the finished decoy formed therein. It is also used in the neck and upper leg area of the decoys to removably secure the head and legs in position in the decoy body when the decoy is in functional use and prevent premature loosening of the neck and leg pins when the decoy is assembled.

2. Description of the Prior Art

Decoys, various molds for manufacturing decoys, and procedures for making such molds have long been known in the art, particularly in the manufacture of such game bird decoys as ducks, geese and turkeys. The general approach in manufacturing a mold to create decoys of selected shape, size and detail is to initially shape a form model to the desired specifications and build the mold around this model. One of the chief difficulties encountered in the construction and use of conventional molds for decoys is the difficulty in constructing molds of sufficient strength and decoy "release" characteristics for large scale, rapid production of decoys. The typical mold is capable of forming only a limited number of decoys before failing due to internal pressure created by the heat and tension of the expanding material, typically polyurethane or polystyrene, used to form the decoy. Another problem inherent in such molds is the difficuly of securing a clean release between the expanded material and the interior surface of the mold after the decoy is formed, a problem which generally causes irregularities in the surface of the decoy and prevents the formation of fine detail. This difficulty is generally realized because most molds are not capable of retaining sufficient internal heat to permit ready disengagement of the decoy from the mold surface after the decoy is sufficiently cured to permit removal from the mold. Accordingly, it will be recognized by those skilled in the art that the difficulty of manufacturing molds having suitable strength and release characteristics is responsible for many of the surface irregularities and lack of detail present in decoys currently on the market, and particularly those game bird decoys which are relatively large, such as turkeys, ducks and geese.

Decoys having removable heads to permit easy transportation are known in the prior art. For example, U.S. Pat. No. 1,157,627 to A. Koyen, et al discloses a duck decoy having a hollow cavity in the body for insertion of the head when the head is removed for transportation purposes. The cavity is molded generally to the proportions of the head in order to secure close tolerance between the head and body when the head is inserted in the body cavity. Similarly, in U.S. Pat. No. 3,408,763 to L. C. Rudolph, twin decoys are disclosed with cavities in the body portion to receive the heads in recessed configuration. As in the A. Koyen patent, the Rudolph twin decoys are designed such that the heads fit the molded cavity to a relatively close tolerance, with the heads lying between the recesses of the two bodies during storage and transport.

It is an object of this invention to provide a new and improved, light-weight decoy formed from a light, strong material characterized by an expanded foam such as polystyrene and polyurethane, which decoy is provided with an internal body cavity for storage of the removable head and legs during transportation, the cavity being sufficiently large to contain not only the head and legs of the decoy, but other accessory items which might be used by the hunter.

Yet another object of this invention is to provide a new and improved hunting decoy which is formed of an expanded foam material and which is characterized by an internal cavity for storing the legs and head during transportation, which decoy is further characterized by a molded body and head of great detail to enhance the life-like characteristics of the decoy.

A still further object of this invention is to provide a new and improved mold for forming the body and head portions of a decoy, which mold is characterized by an exceptionally detailed surface of superior strength and mold release characteristics, which is enhanced by the addition of atomized aluminum to the polymerizable casting resin used to make the mold.

A still further object of the invention is to provide a new and improved mold for forming the body and head of game bird decoys such as turkeys, geese, ducks and the like, from expanded foam materials, such as polyurethane and polystyrene, which mold is formed from a casting resin or polymerized plastic material having atomized aluminum dispersed therein to impart exceptional strength, fine surface detail, and superior heat retention characteristics, and to facilitate quick release of the decoys from the mold and the fast and efficient forming of multiple decoys of high quality from a single mold.

A still further object of the invention is to provide a method and technique for building a mold for the construction of expanded foam decoys, which includes initially forming and shaping a mold model; mixing a "Gell Coat" polymerizable casting resin with a styrene liquid, atomized aluminum powder and an appropriate hardner or catalyzing agent; securing a "dam line" approximately five inches (5") wide around the model by using printer's aluminum tin to divide the model in half; burying one-half of the model in sand to a level even with the dam line separator; waxing the exposed half of the model; pouring the mixed resin, styrene, atomized aluminum and hardner to form a discrete coating on the model; allowing the mixture to dry; applying additional coatings or layers of the mixture to the mold after each successive coating has dried and cooled to create a hard, strong body segment; removing the half-body mold segment so formed and the contained model from the sand; and repeating the laminating process to create the second body segment, the cavity mold segment, and the head segments, as hereinafter described.

SUMMARY OF THE INVENTION

A decoy formed of an expanded foam material; a mold for creating the decoy; and a method of constructing the mold, which decoy comprises a body portion formed of an expanded foam material such as polyurethane or polystyrene, and having an internal cavity formed therein and a head portion adapted for removable cooperation with the body portions, and for storage in the body cavity when the decoy is being transported. The decoy is further characterized by removable legs having pins inserted therein for mounting, which legs are likewise capable of being placed in the cavity for storage. A mold for forming decoys constructed of an expanded foam material, which mold includes matched body and head segments, respectively, and a body cavity mold, all of which are formed of a polymerized plastic casting resin having liquid styrene and atomized aluminum mixed therein to enhance the strength, durability and decoy-release characteristics of the mold. A procedure and technique for building a mold for forming decoys of expanded foam material which includes mixing a polymerizable casting resin material with an appropriate hardner or catalyst, atomized aluminum, and liquid styrene, and applying this mixture in discrete layers on a prefabricated mold model having the desired shape and surface characteristics for the decoy to be produced, to create a pair of body segments, head segments and a cavity segment for the molding of expanded foam decoys.

BRIEF DESCRIPTION OF THE DRAWINGS

The invention will be better understood by reference to the accompanying drawings, wherein:

FIG. 1 is a perspective view of the matching body, head, and cavity segments, respectively, of a preferred decoy mold of this invention;

FIG. 2 is a perspective view of the mold illustrating the matching body segments and the cavity segment in functional position on one of the body segments;

FIG. 3 is a perspective view of the mold illustrated in FIGS. 1 and 2 in the process of being formed, with one of the body segments completed and containing the mold model in position to form the second body segment;

FIG. 4 is a perspective view of the mold and mold model illustrated in FIG. 3, further including a dam line in functional position around the periphery of one body segment to contain the mold-forming components used to shape the second body segment;

FIG. 5 is a perspective view of the mold and mold model illustrated in FIGS. 3 and 4 with a layer of polymerizable mixture being brushed on the mold model;

FIG. 6 is a perspective view of the decoy mold of this invention with the body segments and the cavity mold segment in closed configuration;

FIG. 7 is a perspective view of a typical turkey decoy formed by use of the body and head segments and the cavity mold segment illustrated in FIGS. 1-6;

FIG. 8 is a perspective view of the underside of the decoy illustrated in FIG. 7 with the legs removed, and more particularly illustrating the body cavity therein;

FIG. 9 is a perspective view of the underside of the decoy illustrated in FIGS. 7 and 8 with the legs in functional position and the head in stored configuration inside the body cavity; and FIG. 10 is a side elevation, partially in section, of the decoy illustrated in FIG. 7, more particularly illustrating a preferred technique of removably placing the decoy head and legs in the body to set up the decoy.

DESCRIPTION OF THE PREFERRED EMBODIMENTS

Referring now to FIGS. 1, 2 and 6 of the drawings, the decoy of this invention is formed by use of a decoy mold, generally illustrated by reference numeral 1, and includes a first body segment 2, a second body segment 3, and a cavity mold segment 4, as illustrated in FIG. 1. The decoy head is molded by use of a first head segment 7 and a matching second head segment 8 in the same manner as first body segment 2 and second body segment 3. The matching first head segment 7 and second head segment 8 define an internal head cavity 13, and an optional pour aperture 14 is provided in first head segment 7 and second head segment 8 to provide access to head cavity 13. The cavity mold segment 4 of decoy mold 1 is characterized by an interior cavity mold segment 5, which projects into body cavity 12 of first body segment 2 and second body segment 3 when cavity mold segment 5 is positioned as illustrated in FIG. 2. Cavity mold segment 4 further includes an exterior cavity mold segment 6, which extends from body cavity 12 and is formed integrally with interior cavity mold segment 5. Accordingly, when cavity mold segment 4 is positioned on second body segment 3 with the cup-like interior cavity mold segment 5 projecting into body cavity 12, first body segment 2 can be positioned over cavity mold segment 4 and in registration with second body segment 3 by alignment of match pegs 9, carried by first body segment 2 and peg apertures 10, formed in second body segment 3. First body segment 2 and second body segment 3 register and fit together in close tolerance along match face 11 formed in the periphery of both body segments. When first body segment 2, second body segment 3 and cavity mold segment 4 are in registration with each other as described above, decoy mold 1 assumes the closed configuration shown in FIG. 6. The mold is now capable of being used to shape and form a decoy as hereinafter described.

Referring now to FIGS. 3-5, and again to FIG. 6 of the drawings, decoy mold 1 is created by first sculpturing a mold model 15 in the desired shape and configuration, for example, in the shape of a turkey. Mold model 15 generally includes a projecting model neck 16, model legs 17, and a model cavity 18, more particularly illustrated in FIG. 3. When mold model 15 is complete as to all desired specifications and details, a dam line 19 is positioned on mold model 15 dividing mold model 15 approximately in half longitudinally with the dam line 19 skirting model cavity 18, and half of the model is buried in sand up to dam line 19. In a preferred embodiment of the invention dam line 19 is formed from modeling clay and printer's aluminum tin, and is approximately 5 inches in width. The exposed side of mold model 15 is then waxed, and the wax is allowed to dry, after which a second coating of wax is placed on the model. In another preferred embodiment the wax used to coat mold model 15 to prevent the mold-forming casting mixture from sticking is wax sold under the "Johnson" trademark, and the wax is warmed to permit easier application and effect a more homogeneous coating.

While the second coat of wax is drying on mold model 15, a mixture of clear, polymerizable casting resin, liquid styrene and atomized aluminum powder is prepared for application to mold model 15. In a most preferred embodiment of the invention, two cups of clear S-216 "Gell Coat" casting resin, manufactured by Coating and Plastics, Inc. of Fort Smith, Arkansas, is measured, and one tablespoon of styrene liquid is added to the resin, with one heaping tablespoon of atomized aluminum powder, and approximately one-half teaspoon of "Castolite" catalyst of hardner to initiate polyerization of the resin. After these ingredients are thoroughly mixed, the resin mixture is poured over the waxed half of the mold model 15, spread evenly, and allowed to dry and cool to room temperature. An additional quantity of casting resin mixture is then prepared and the procedure repeated with the mixture also allowed to cool to room temperature. The second layer of resin mixture is then covered with a layer of fiberglass cloth mat and the cloth is pressed into the mixture. A third quantity of the casting resin mixture is then prepared and poured over the glass cloth mat and first two resin layers, and is allowed to dry and again cool to room temperature. A fourth quantity of the resin mixture is then mixed, poured over the previously applied coatings and allowed to cool to room temperature. It has surprisingly been found that each application of the casting resin mixture must be allowed to dry and cool to room temperature prior to application of the next successive coating in order to prevent decoy mold 1 from warping in use. When the fourth coat of casting resin mixture is completely dry and cool, mold model 15 and the polymerized mold shell are removed from the sand, the sand is brushed from the mold, and the dam line 19 is removed. Mold model 15 and the newly formed second body segment 3 of decoy mold 1 are then placed on a flat surface with the exposed half of mold model 15 projecting upward, as illustrated in FIG. 3, and a second dam line 19 is applied around the periphery of the match face 11 of second body segment 3, with a plurality of peg apertures 10 drilled in match face 11 and match pegs 9 placed in peg apertures 10. The procedure outlined above for forming second body segment 3 is followed to shape first body segment 2, and the entire decoy mold 1, with mold model 15 enclosed therein is trimmed before the last coat of casting resin mixture is completely dry. In order to shape cavity mold segment 4, an additional length of dam line 19 is positioned around the periphery of model cavity 18, and wax is applied on the inside surfaces of model cavity 18 and the surrounding area to prevent the casting resin mixture from adhering to the inner surface of the cavity. A first coat of casting resin mixture of poured in model cavity 18 and in the area between model legs 17, and is allowed to dry and cool to room temperature. The procedure set forth above for forming segment 2 is then used to produce cavity mold segment 4. As further illustrated in FIG. 5 of the drawings, the casting resin mixture may be applied by means of a paint brush 35 in order to evenly coat mold model 15 with the resin mixture. When the mixture is thoroughly dried and cools to room temperature, decoy mold 1 is finally trimmed to remove any excess accummulations of casting resin mixture and glass cloth mat, and the mold is again shaped in the configuration illustrated in FIG. 6. When the mold is completed, a two inch (2") opening is cut in the bottom of the mold to form a pour aperture 14 for introduction of expanded foam material, and first body segment 2 and second body segment 3 are forced apart, cavity mold segment 4 is removed as illustrated in FIG. 1 of the drawings, and the mold is ready for use in shaping decoys. It will be appreciated by those skilled in the art that first head segment 7 and second head segment 8 are formed from casting resin in similar fashion to first body segment 2 and second body segment 3, as described above.

Referring now to FIGS. 7–9 of the drawings, a decoy 21 which matches the shape and surface characteristics of mold model 15 can be formed by using decoy mold 1 as follows: First, the inside surfaces of decoy mold 1 are waxed, the mold is heated, and first body segment 2, second body segment 3 and cavity mold segment 4 are clamped together, and a mixture of urethane foam of selected density and concentration is poured into decoy mold 1 through pour aperture 14. A stopper is then placed in pour aperture 14 to seal decoy mold 1. As the urethane foam polymerizes, it expands, filling the body cavity 12 of decoy mold 1, and shaping decoy body 22, decoy upper legs 23, and decoy neck 26, as illustrated in FIG. 7. The expanded polyurethane is retained in the mold for approximately 15 minutes, after which time the clamps are removed, decoy mold 1 is disassembled, and a decoy 21 is removed from the mold. Decoy 21 is then washed thoroughly with grease relief to remove the wax, and is ready to be painted. After the residual polyurethane is cleaned from the mold and the mold is again waxed, a second decoy can be produced from decoy mold 1 by repeating the procedure described above, except for the heating step. Expansion of the foam provides sufficient heating of decoy mold 1 to facilitate subsequent decoy formation. The decoy head 32 can be formed in the same manner as decoy body 22 by use of first head segment 7 and second head segment 8, illustrated in FIG. 1. However, in a preferred embodiment of the invention a measured quantity of polyurethane mixture is poured into either first head segment 7 of second head segment 8 and the segments are clamped to contain the expanding foam.

Referring now specifically to FIGS. 8 and 9 of the drawings, in a preferred embodiment of the invention a pair of decoy lower legs 24 are shaped from a wooden dowel, and are sharpened, or a pair of leg pins 25 may be inserted in one end of lower legs 24 to provide a means for supporting the decoy 21 in an upright, lifelike position in the field. Similarly, a neck pin 27 is fitted in decoy head 32 to match decoy head 32 with decoy neck 26 along head match line 33. In yet another preferred embodiment of the invention, and referring now specifically to FIG. 10 of the drawings, a hardened neck seat 30 is provided in decoy neck 26 by first drilling a hole in decoy neck 26 which is larger than neck pin 27. A mixture of casting resin, styrene, atomized aluminum and catalyst is prepared as described above, and is placed in the drilled hole to form a hard surface or neck seat 30, for matching with neck pin 27 to prevent decoy head 32 from loosening on decoy neck 26 with repeated use. A similar procedure is used to form a leg seat 31 in leg apertures 28 formed in decoy upper legs 23 for the same purpose. Furthermore, referring again to FIGS. 8 and 9, decoy cavity 29, formed by cavity mold segment 4 of decoy mold 1, is sufficiently deep and long, embedded within decoy body 22 to accommodate decoy lower legs 24 fitted with leg pins 25 and decoy head 32.

It will be appreciated by those skilled in the art that a key ingredient in the casting resin mixture is the atomized aluminum powder, which powder not only lends strength to the mixture by dispersing in the polymerized mold, but also serves to provide a heat sink for retention of heat generated during the expansion of the polyurethane in order to facilitate quick release of a decoy 21 from decoy mold 1 after the urethane mixture has expanded. While this release of the decoy from the mold is partially facilitated by the wax applied to the inside surface of decoy mold 1, it is more particularly facilitated by the presence of the atomized aluminum particles in the mold. It has surprisingly been found that aluminum particles are particularly well suited to effect such a quick release and high strength characteristics of the mold, since iron powder or particles have been found not to achieve the desired results. Accordingly, it has been surprisingly found that not only do the aluminum particles serve to permit the mold to be quickly and easily released from the decoy after formation of the decoy, but the release is achieved with minimum marring of the exterior surface characteristics of the decoy removed. Consequently, exceptionally fine detail on the decoys shaped and formed by the mold of this invention is possible, and the finished, painted product reflects the fine details so accomplished.

It will also be appreciated by the skilled artesian that various compositions of urethane and styrene mixtures can be used to create decoys according to the teachings of this invention. While polyurethane of selected density is a preferred material for use, it will be recognized that other selected expanded foam materials such as polystyrene and the like may also be used. A most preferred component is a urethane material marketed by General Latex and Chemical Corporation of Ashland, Ohio, under the registered trademark, "Vultafoam". Urethane foam is particularly well suited for shaping the decoys since it picks up the fine details in the mold. Furthermore, a most preferred casting resin for use in building the mold of this invention is the clear "Gell Coat" resin, which exhibits desirable viscosity characteristics at preferred mold-construction temperatures of about 57 to about 70 degrees farenheit.

In yet another preferred embodiment of the invention either first body segment 2 or second body segment 3 of decoy mold 1 is mounted on a base or stand in order to better facilitate dismantling and clamping of the mold during the course of producing decoys.

Accordingly, having described my invention with the particularity set forth above, what is claimed is:

1. A decoy formed from an expanded foam material and comprising a body shaped to resemble a game bird; a cavity in the bottom of said body; leg projections on each side of said cavity and leg seats in said leg projections for removably receiving legs to support said decoy and a neck projection on the top of said body and a neck seat in said neck projection for removably receiving a head, said neck seat and said leg seats formed of a casting resin containing particles of aluminum.

* * * * *